Patented May 25, 1948

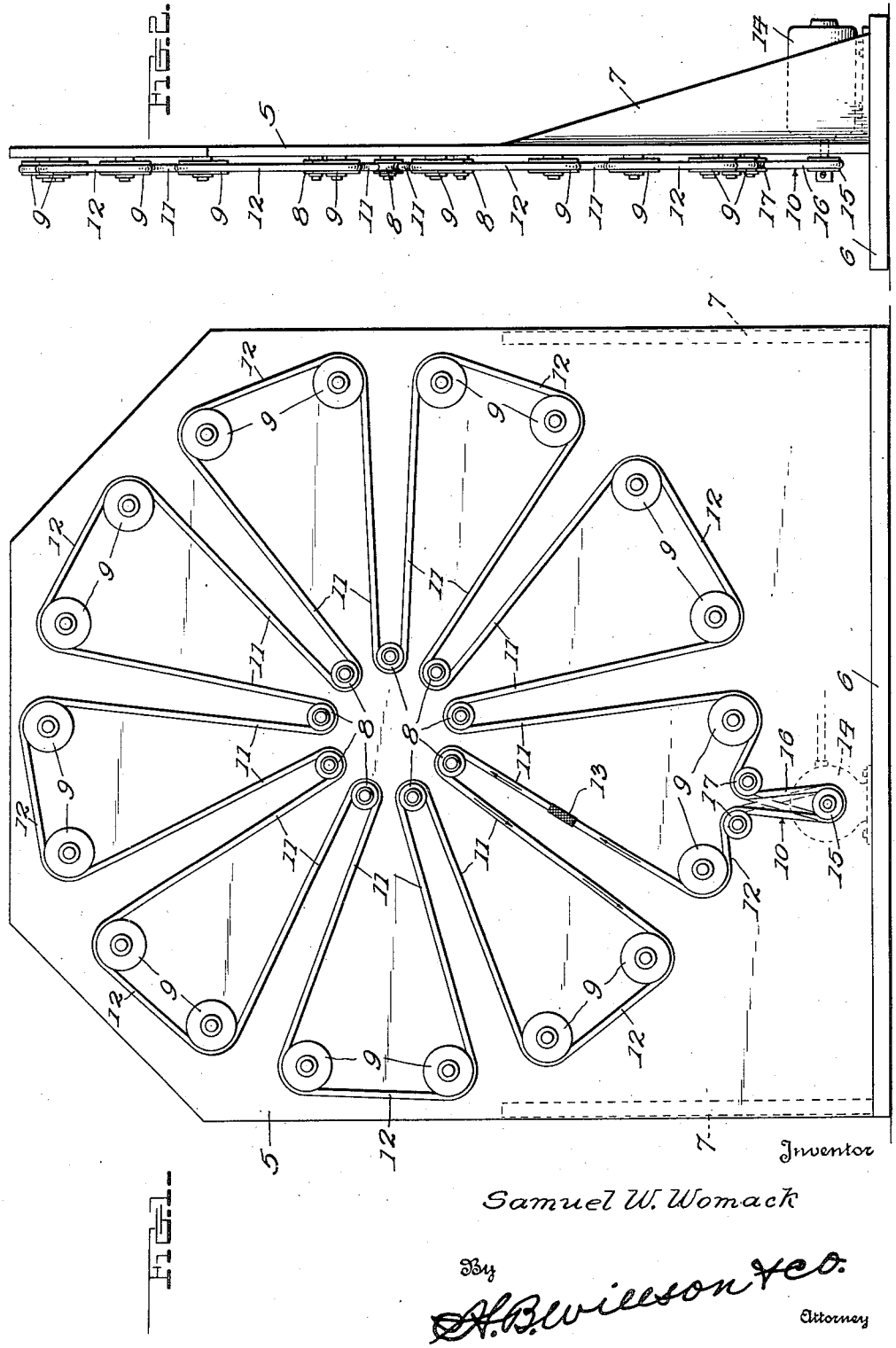

2,442,255

UNITED STATES PATENT OFFICE 2,442,255

EYE EXERCISER

Samuel W. Womack, Quanah, Tex.

Application January 24, 1947, Serial No. 724,015

2 Claims. (Cl. 128—76.5)

The invention aims to provide a new and improved device for use in treating human eye ailments, by causing the patient to exercise his eyes by keeping them focused on a conspicuous spot or "target" which is continuously moved in numerous directions.

I provide a suitably guided belt carrying the aforesaid spot or "target" and having reaches which are driven in various directions, and a further object is to provide means for reversing the direction of travel of said belt, thus making it possible to cause more eye movements than otherwise.

A still further object is to provide a relatively simple device which may be easily and inexpensively manufactured, and profitably sold at a reasonable price.

Figure 1 of the accompanying drawing is a front elevation of the device.

Fig. 2 is an edge view.

A preferred construction has been illustrated in the drawings and will be rather specifically described, but within the scope of the invention as claimed, variations may be made.

A suitable type of support is shown at 5, in the form of a vertical wall suitably secured to a base 6 and appropriately braced at 7. An inner series of circularly spaced, peripherally grooved pulleys 8 is appropriately mounted on the support 5, the axes of all of these pulleys being horizontal. Surrounding this inner series of pulleys and spaced therefrom, is an outer series of circularly spaced pulleys 9, all of these pulleys being peripherally grooved and having their axes horizontal. An endless belt 10 of circular cross section, is so trained around the various pulleys 8 and 9 that said belt is provided with substantially radial reaches 11, and with circumferential reaches 12, said substantially radial reaches extending between the inner and outer pulleys 8 and 9, and said circumferential reaches extending only between said pulleys 9. The belt 10 is provided with a conspicuous spot or "target" 13, and means are provided for driving said belt, thus causing the spot or "target" to travel inwardly, outwardly and circumferentially in various directions. Thus, by the patient keeping either or both of his eyes focused upon the spot or "target" 13, eye movements will be caused in numerous directions, giving the known benefits of eye exercises.

For driving the belt 10, I have shown a small electric motor 14 mounted on the base 6 and having a belt-engaging pulley 15. One of the circumferential reaches of the belt is outwardly looped at 16 around the pulley 15 and is guided by appropriate idlers 17. The loop 16 is sufficiently long to allow it to be readily removed from the pulley 15 and crossed as shown in dotted lines in Fig. 1, whereupon reapplication of the loop to the pulley 15, will insure driving of the belt in the reverse direction, thus making it possible to cause more eye movements than otherwise.

By simply driving the belt, the spot or "target" 13 will be caused to move in numerous directions, and if the patient keeps one or both eyes focused on this target, his eye or eyes will have to move correspondingly in order to follow it, thus giving beneficial eye exercises. The belt may be quickly and easily crossed between the drive pulley 15 and the idlers 17, whenever it is desired to drive the belt in the reverse direction, and obviously such reverse driving will cause the patient's eyes to travel in other directions while following the spot or "target" 13.

From the foregoing, it will be seen that novel and advantageous provision has been made for carrying out the objects of the invention but attention is invited to the fact that the present disclosure is illustrative rather than limiting.

I claim:

1. An eye exerciser comprising a support, an inner series of pulleys mounted on said support and spaced apart circularly, said pulleys having their axes parallel, an outer series of pulleys mounted on said support and spaced apart circularly, these outer pulleys having their axes parallel with those of the inner pulleys, a belt trained around said inner and outer pulleys and having substantially radial reaches extending from the inner to the outer pulleys, and circumferential reaches extending between said outer pulleys, said belt having a conspicuous spot on which to keep the eye focused, and means for driving said belt.

2. An eye exerciser comprising a horizontal base, a flat vertical wall rising therefrom, an inner series of pulleys mounted on the front of said wall and spaced apart circularly, said pulleys having their axes parallel, an outer series of pulleys mounted on said front of the wall and spaced apart circularly and outward from said inner series, these outer pulleys having their axes parallel with those of the inner pulleys, an electric motor mounted on said base at the rear of said wall and having its shaft extending through said wall to the front thereof, a pulley fixed to the front end of the motor shaft, idler pulleys mounted on the front of said wall adjacent to two of the pulleys of said outer series and to the pulley on said motor, and a belt trained around all of said pulleys, said belt having substantially radial reaches extending from the inner to the outer pulleys and circumferential reaches extending between said outer pulleys, said belt having a conspicuous spot on which to keep the eyes focused.

SAMUEL W. WOMACK.

REFERENCES CITED

The following references are of record in the file of this patent:

UNITED STATES PATENTS

| Number | Name | Date |
|---|---|---|
| 1,121,945 | Smith | Dec. 22, 1914 |
| 1,702,700 | Martin | Feb. 19, 1929 |